United States Patent
Kobayashi et al.

(10) Patent No.: US 8,210,602 B2
(45) Date of Patent: Jul. 3, 2012

(54) AUTOMOBILE ROOF STRUCTURE

(75) Inventors: Masaya Kobayashi, Okazaki (JP);
Hiroshi Okumura, Kariya (JP);
Yasunari Sakai, Toyota (JP)

(73) Assignee: Toyota Shatai Kabushiki Kaisha, Kariya (JP)

( * ) Notice: Subject to any disclaimer, the term of this patent is extended or adjusted under 35 U.S.C. 154(b) by 203 days.

(21) Appl. No.: 12/672,828

(22) PCT Filed: Oct. 30, 2008

(86) PCT No.: PCT/JP2008/069742
§ 371 (c)(1),
(2), (4) Date: Feb. 9, 2010

(87) PCT Pub. No.: WO2009/066552
PCT Pub. Date: May 28, 2009

(65) Prior Publication Data
US 2011/0121614 A1    May 26, 2011

(30) Foreign Application Priority Data
Nov. 19, 2007   (JP) .................. 2007-299041

(51) Int. Cl.
*B62D 25/04*    (2006.01)
(52) U.S. Cl. .......... 296/203.03; 296/187.12; 296/193.06
(58) Field of Classification Search .................. 296/29,
296/30, 104, 187.12, 193.05, 193.06, 203.03,
296/210, 214
See application file for complete search history.

(56) References Cited

U.S. PATENT DOCUMENTS

| | | | | |
|---|---|---|---|---|
| 4,423,902 A | * | 1/1984 | Yaotani et al. | 296/214 |
| 4,971,388 A | * | 11/1990 | Knaggs | 296/214 |
| 5,120,593 A | * | 6/1992 | Kurihara | 428/174 |
| 5,226,696 A | * | 7/1993 | Klages et al. | 296/203.01 |
| 5,318,338 A | * | 6/1994 | Ikeda | 296/210 |
| 5,352,011 A | * | 10/1994 | Kihara et al. | 296/203.03 |
| 5,681,076 A | * | 10/1997 | Yoshii | 296/210 |

(Continued)

FOREIGN PATENT DOCUMENTS

GB    2084941 A  *  4/1982

(Continued)

OTHER PUBLICATIONS

International Search Report issued on Jan. 20, 2009 in International Application No. PCT/JP2008/069742 (with translation). Written Opinion of the International Search Authority issued on Jan. 20, 2009 in International Application No.PCT/JP2008/069742 (with partial relevant translation).

*Primary Examiner* — Glenn Dayoan
*Assistant Examiner* — Paul Chenevert
(74) *Attorney, Agent, or Firm* — Oliff & Berridge, PLC

(57) ABSTRACT

An automobile roof structure in which each end of the roof reinforcement member is connected to a roof side rail via a bracket, the base end of the bracket is fixed to the end of the roof reinforcement member, a base plate of the bracket has upstanding sections that extend to a head edge of the base plate, the upper end of an upstanding end edge of each upstanding section abuts the upper end of a vehicle interior side-surface of the roof side rail, a gap is provided between the lower portion of the upstanding end edge and the side surface. A rotational moment M that is induced in the roof side rail by a collision load acting from the center pillar is not transmitted to the roof reinforcement member 4.

6 Claims, 6 Drawing Sheets

U.S. PATENT DOCUMENTS

| | | | |
|---|---|---|---|
| 5,873,618 A * | 2/1999 | Ejima | 296/30 |
| 6,322,135 B1 * | 11/2001 | Okana et al. | 296/203.03 |
| 6,616,221 B2 * | 9/2003 | Lumpe et al. | 296/210 |
| 6,619,729 B2 * | 9/2003 | Kimura et al. | 296/203.03 |
| 6,715,822 B2 * | 4/2004 | Lumpe et al. | 296/210 |
| 6,962,389 B2 * | 11/2005 | Katsuma | 296/187.12 |
| 7,121,615 B2 * | 10/2006 | Hoshino | 296/203.03 |
| 7,165,806 B2 * | 1/2007 | Osterberg et al. | 296/203.03 |
| 7,810,871 B2 * | 10/2010 | Matsui | 296/187.12 |
| 7,883,142 B2 * | 2/2011 | Hosaka et al. | 296/210 |
| 7,988,182 B2 * | 8/2011 | Park | 280/728.2 |
| 8,042,863 B2 * | 10/2011 | Nydam | 296/210 |
| 8,123,286 B2 * | 2/2012 | Furusako et al. | 296/203.03 |
| 2004/0212222 A1 * | 10/2004 | Katsuma | 296/203.03 |
| 2009/0174228 A1 * | 7/2009 | Duguet et al. | 296/214 |
| 2010/0127532 A1 * | 5/2010 | Hosaka et al. | 296/193.06 |
| 2011/0266837 A1 * | 11/2011 | Losch et al. | 296/193.06 |

FOREIGN PATENT DOCUMENTS

| | | |
|---|---|---|
| JP | 57007768 A * | 1/1982 |
| JP | A-9-20266 | 1/1997 |
| JP | A-9-267767 | 10/1997 |
| JP | A-10-100936 | 4/1998 |
| JP | A-2007-83830 | 4/2007 |

* cited by examiner

PRIOR ART

PRIOR ART

PRIOR ART

AUTOMOBILE ROOF STRUCTURE

TECHNICAL FIELD

The invention relates to an automobile roof structure, and more particularly to a joint structure between left and right roof side rails and a roof reinforcement member that spans across the roof side rails.

BACKGROUND ART

In automobile roof structures, a pair of left and right roof side rails is provided extending in a front-rear direction on both side edges, left and right, of a roof panel. A roof reinforcement member is provided across the roof side rails, in a vehicle width direction, along the underside of the roof panel. From the viewpoint of, for instance, workability during the roofing operation, the roof reinforcement member is ordinarily shorter than the distance between the left and right roof side rails. The roof reinforcement member is connected to the roof side rails via brackets at the ends of the roof reinforcement member.

During a vehicle side collision, a center pillar of the vehicle is acted upon by a load that bends and deforms the center pillar into a V shape that points toward the interior of the vehicle. As a result, a rotational moment is generated that twistingly deforms the roof side rail, and that pushes the lower edge of the roof side rail toward the vehicle interior, at the joint of the roof side rail with the upper end of the center pillar and at nearby positions.

When the roof reinforcement member is solidly connected to the roof side rails via the brackets, the connection positions stand at the upper ends of the roof side rails. Therefore, a substantial bending force acting on the roof reinforcement member may cause the latter to bend. The roof panel as a whole may become extensively damaged as a result.

Several measures have been conventionally devised with a view to preventing the rotational moment of the roof side rails from being transmitted to the roof reinforcement member during a side collision (for instance. JP-A-10-100936).

FIGS. 4 and 5 illustrate an example of such a conventional structure. A bracket 6 made up of a metal plate is provided on a roof side rail 2, at the joint thereof with a center pillar 3. The bracket 6 has tongue-like protruding pieces 61, 61 that protrude toward the vehicle interior. The protruding pieces 61, 61 are inserted into the end of a roof reinforcement member 4, which has a corrugated cross section and is provided on the underside of a roof panel 1, to cause the bracket 6 to engage thereby with the roof reinforcement member 4. An outer end 62 of the bracket 6 on the exterior of the vehicle is fixedly bolted to an interior a side surface 21 of the roof side rail 2.

As shown in FIG. 6, when the roof side rail 2 is twistingly deformed during a side collision, the protruding pieces 61, 61 of the bracket 6 deform upward as a result, and shift relative to the roof reinforcement member 4, so that virtually no bending force acts on the roof reinforcement member 4.

DISCLOSURE OF THE INVENTION

Problems to be Solved by the Invention

Bending of the roof reinforcement member 4 is prevented in the above conventional structure, but support of the roof side rail 2 from the interior of the vehicle is lost, and the gap L between the roof side rail 2 and the end of the roof reinforcement member 4 becomes narrower than it originally was (FIG. 5). Thereupon, the entire center pillar 3 moves toward the vehicle interior, squeezing the latter, in proportion to the shortening of the gap L.

Therefore, it is an object of the invention to provide an automobile roof structure that allows preventing bending of a roof reinforcement member on account of a load exerted on a center pillar, and that allows suppressing intrusion of the center pillar into the vehicle interior, during a side collision of a vehicle.

Means for Solving the Problems

The invention is an automobile roof structure, having left and right roof side rails extending in a front-rear direction along left and right side edges of a roof panel, and supported by a center pillar of a side surface of a vehicle body; and a roof reinforcement member extending in a vehicle width direction along the underside of the roof panel, with both ends of the roof reinforcement member whose total length is shorter than the distance between the left and right roof side rails being connected to the roof side rails via brackets, wherein each bracket fixes, to an end of the roof reinforcement member, a base end of the base plate that connects the end of the roof reinforcement member to each roof side rail; an upstanding section is formed, on the base plate of the bracket, to extend in the longitudinal direction of the bracket, and a protruding piece is formed, on a head edge that opposes the roof side rail, to extend tongue-like from the head edge; an upper end of the upstanding end edge of the upstanding section erected on the head edge abuts a side surface of the roof side rail on a vehicle interior side, and a lower portion of the upstanding end edge does not abut the side surface, with a gap being provided therebetween; and a slit is formed on the side surface of the roof side rail, on the vehicle interior side, at a position lower than an abutting position against the upstanding end edge of the upstanding section, such that the protruding piece is inserted into the slit.

During a vehicle side collision, the load acting on the center pillar gives rise to a rotational moment in the roof side rail, whereby the roof side rail rotates about the portion, as a pivot point, at which the roof side rail abuts the upstanding end edge of the bracket, and the protruding piece penetrates down into the slit, so that the rotational moment of the roof side rail is not transmitted to the roof reinforcement member. The roof side rail is supported, on the vehicle interior side, by the roof reinforcement member, at the portion at which the roof side rail abuts the bracket. This prevents the entire center pillar from moving into the vehicle interior on account of the collision load.

The upstanding end edge of the upstanding section is erected substantially linearly in an oblique direction relative to the side surface such that the upper end of the upstanding end edge abuts the side surface of the roof side rail, on the vehicle interior side, and a substantially triangular gap is provided between the lower portion of the upstanding end edge and the side surface.

As a result, the roof side rail can rotate without loading the roof reinforcement member in doing so.

The protruding piece extends, from the head edge of the base plate of the bracket obliquely, downward toward the exterior of the vehicle, and the leading end of the protruding piece is inserted into the slit.

As a result, the protruding piece can move smoothly into the slit during rotation of the roof side rail.

A plurality of upstanding sections is formed in the base plate, and the latter has a corrugated cross-sectional shape.

This contributes to enhancing the bending stiffness of the base plate.

The cross-sectional shape of the base end of the base plate is identical to the cross-sectional shape of the end of the roof reinforcement member, and the base end is overlappingly fixed to the end of the roof reinforcement member.

The roof reinforcement member and the bracket can be connected to each other thereby easily and solidly.

The roof reinforcement member is disposed at a position corresponding to left and right center pillars of the side surfaces of the vehicle body, and both ends of the roof reinforcement member are connected, via the brackets, to joints between the roof side rails and the center pillars.

The invention is particularly effective when used in a structure that connects, via a bracket, a roof reinforcement member with the joint of a center pillar and a roof side rail.

BEST MODE FOR CARRYING OUT THE INVENTION

Figure 1:
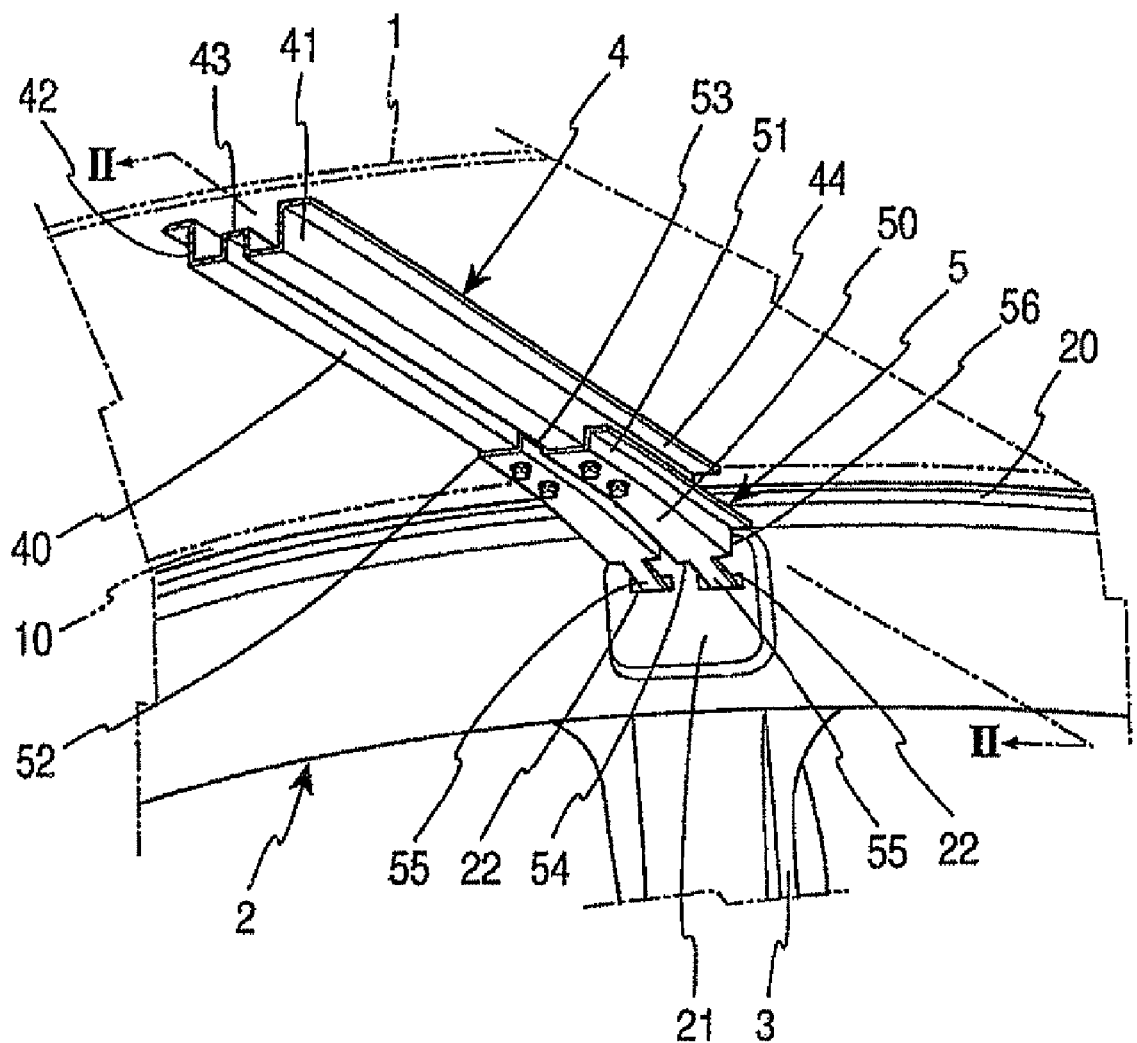
FIG. 1 is a schematic perspective-view diagram illustrating a roof structure of the invention.

An automobile roof structure in which the invention is used is explained next based on FIGS. 1 and 2. The roof structure is left-right symmetrical, and thus the explanation below will focus on one side.

The roof structure is provided with a roof side rail 2 that extends in the front-rear direction along a side edge of a roof panel 1. The roof side rail 2 has an inner panel 2a and an outer panel 2b that make up a closed cross-section structure. A reinforcement 2c, as a reinforcing member, is provided in the interior of the roof side rail 2.

Figure 2:
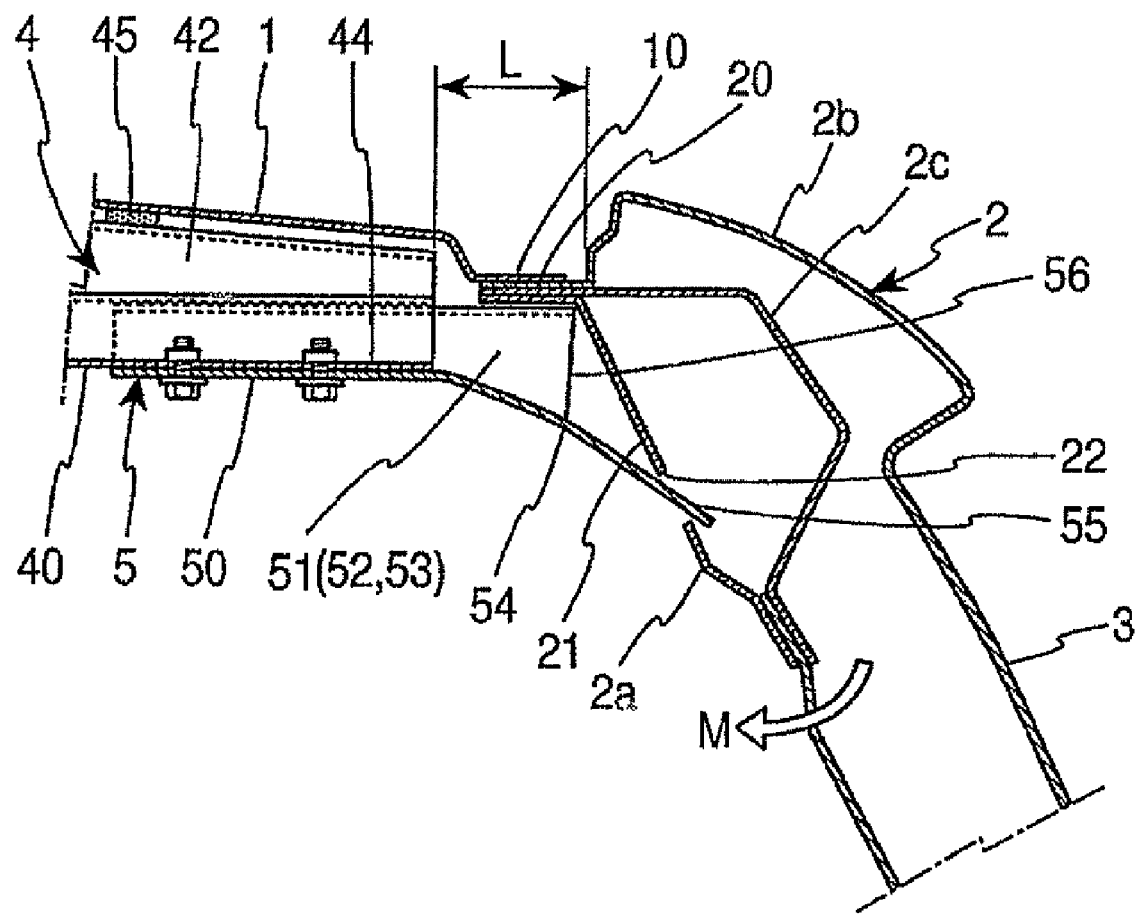
FIG. 2 is a cross-sectional diagram along line II-II of FIG. 1.

FIG. 2 is a longitudinal cross-sectional diagram at a front-rear intermediate position of the roof side rail 2, at a position corresponding to a center pillar 3 that is erected on a side surface of the body. The roof side rail 2 is joined to the upper edge of the center pillar 3 in such a manner that the closed cross section of the roof side rail 2 and the closed cross section with the center pillar 3 are contiguous.

The roof side rail 2 is provided with an upper edge flange 20, which protrudes into the vehicle interior, for welding together, overlappingly from top to bottom, respective joint flanges of the upper edge of the inner panel 2a, the outer panel 2b and the reinforcement 2c.

A side edge portion 10 is provided on the side end of the roof panel 1, the side edge portion 10 being formed lower than an ordinary roof surface that constitutes a substantially flat surface.

The roof panel 1 and the roof side rail 2 are welded together, with the side edge portion 10 of the roof panel 1 being overlaid on the upper edge flange 20 of the roof side rail 2.

As illustrated in FIGS. 1 and 2, a roof reinforcement member 4 extending in the vehicle width direction is provided on the underside of the roof panel 1, at a position corresponding to the center pillar 3. The roof reinforcement member 4 is made up of a metal plate and is shaped to a corrugated cross section, in such a way so as to form side-edge upstanding sections 41, 42 that stand, flange like, on both side edges of a base plate 40 that forms a bottom wall, and so as to form a central upstanding section 43 that is erected, to a trapezoidal cross-sectional shape, upward along the longitudinal direction of the base plate 40, at a central position in the width direction of the base plate 40. The side-edge upstanding sections 41, 42 stand higher than the central upstanding section 43.

The total length of the roof reinforcement member 4 along the vehicle width direction is set in accordance with the length of the above-mentioned general section of the roof panel 1, to be shorter than the distance between the roof side rails 2 on the left and right. This is in order to dispose beforehand the roof reinforcement member 4 on the underside of the roof panel 1 during assembly of the roof panel 1 and the roof side rail 2.

The upper edge flanges of the side-edge upstanding sections 41, 42 of the roof reinforcement member 4 are overlappingly bonded via an adhesive 45, such as a mastic sealer or the like, onto the underside of the general surface of the roof panel 1.

The roof reinforcement member 4, having thus an overall length shorter than the distance between the roof side rails 2 on the left and right, is provided with a bracket 5 at each end 44, in such a manner that the latter is extended beyond the vehicle body, such that the roof reinforcement member 4 is connected via the bracket 5 to a side surface 21, in the vehicle interior, of the joint between the roof side rail 2 and the center pillar 3.

The bracket 5 is a press-molded product made up of a metal plate, and has a base plate 50 corresponding to the base plate 40 of the roof reinforcement member 4, side-edge upstanding sections 51, 52 corresponding to the side-edge upstanding section 41, 42 of the roof reinforcement member 4, and a central upstanding section 53 corresponding to the central upstanding section 43 of the roof reinforcement member 4. The cross-sectional shape of the bracket 5 is substantially the same as that of the roof reinforcement member 4. The height of the side-edge upstanding sections 51, 52 of the bracket 5 is smaller than that of the side-edge upstanding section 41, 42 of the roof reinforcement member 4. The heights of the side-edge upstanding sections 51, 52 and the central upstanding section 53 are set to be substantially identical.

The leading end of the base plate 50 of the bracket 5, on the vehicle exterior side, takes on an oblique attitude, such that the leading end slants slightly downward and outward of the vehicle, toward a head edge 54 of the base plate 50. The head edge 54 has formed thereon a pair of tongue-shaped protruding pieces 55, 55 that extend obliquely downward, in a straight line, toward the exterior of the vehicle.

The base end of the base plate 50 of the bracket 5, on the vehicle interior side is overlappingly fastened and fixed to the underside of the end of the base plate 40 of the roof reinforcement member 4 on the vehicle exterior side in use of a plurality of bolt members.

The upper ends, on the vehicle exterior side, of respective upstanding end edges 56 of the central upstanding section 53 and the side-edge upstanding sections 51, 52 abut against a root bent portion of the upper edge flange 20, on the vehicle exterior side of the bracket 5, at the upper end position of the side surface 21 that is formed by the inner panel 2a of the roof side rail 2. Thereby, the pair of protruding pieces 55, 55 becomes inserted into a pair of respective slits 22, 22 that are formed at an intermediate position of the side surface 21 in the vertical direction, or at a position lower than the intermediate position, in a state where the head edge 54 of the base plate 50 stands spaced apart from the side surface 21. The roof reinforcement member 4 and the roof side rail 2 become connected as a result.

Herein, the upstanding end edges 56 of the side-edge upstanding sections 51, 52 and the central upstanding section 53 of the bracket 5 are formed to a substantially vertical attitude. The lower portion of the upstanding end edges 56, excluding the upper ends thereof that abut the side surface 21 that slants downward toward the exterior of the vehicle, has an oblique attitude with respect to the side surface 21, and is thus spaced apart from the latter. A substantially triangular gap forms thereby between the upstanding end edges 56 and the side surface 21.

To assemble the bracket 5 between the roof reinforcement member 4 and the roof side rail 2, firstly the protruding pieces 55, 55 are inserted into the slits 22, 22 of the side surface 21 of the roof side rail 2. In that state, the upper ends of the upstanding end edges 56 are caused to abut the side surface 21, and the base end of the base plate 50 is fastened to the roof reinforcement member 4.

Figure 3:
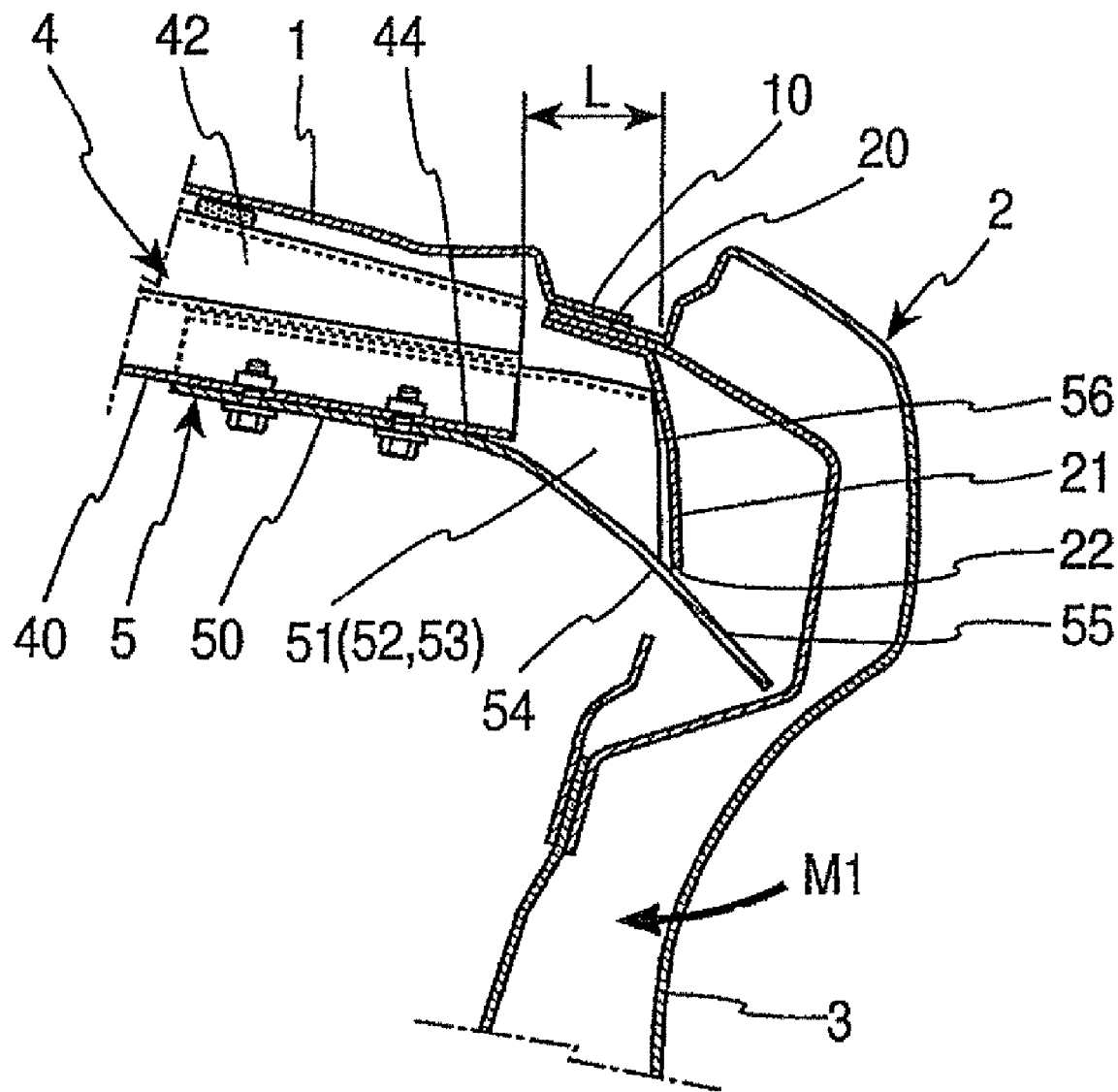
FIG. 3 is a cross-sectional diagram illustrating the situation of the roof structure of the invention in FIG. 2 during a vehicle side collision.
Figure 4:
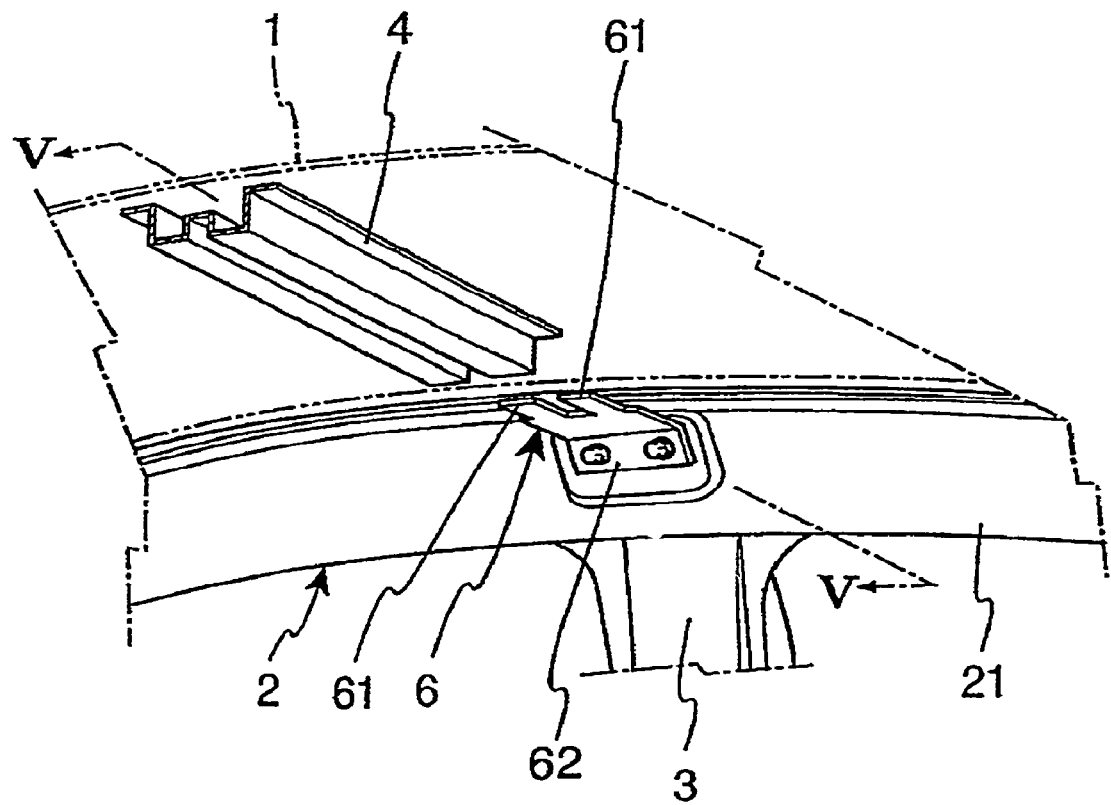
FIG. 4 is a schematic perspective-view diagram of a prior art roof structure corresponding to FIG. 1.
Figure 5:
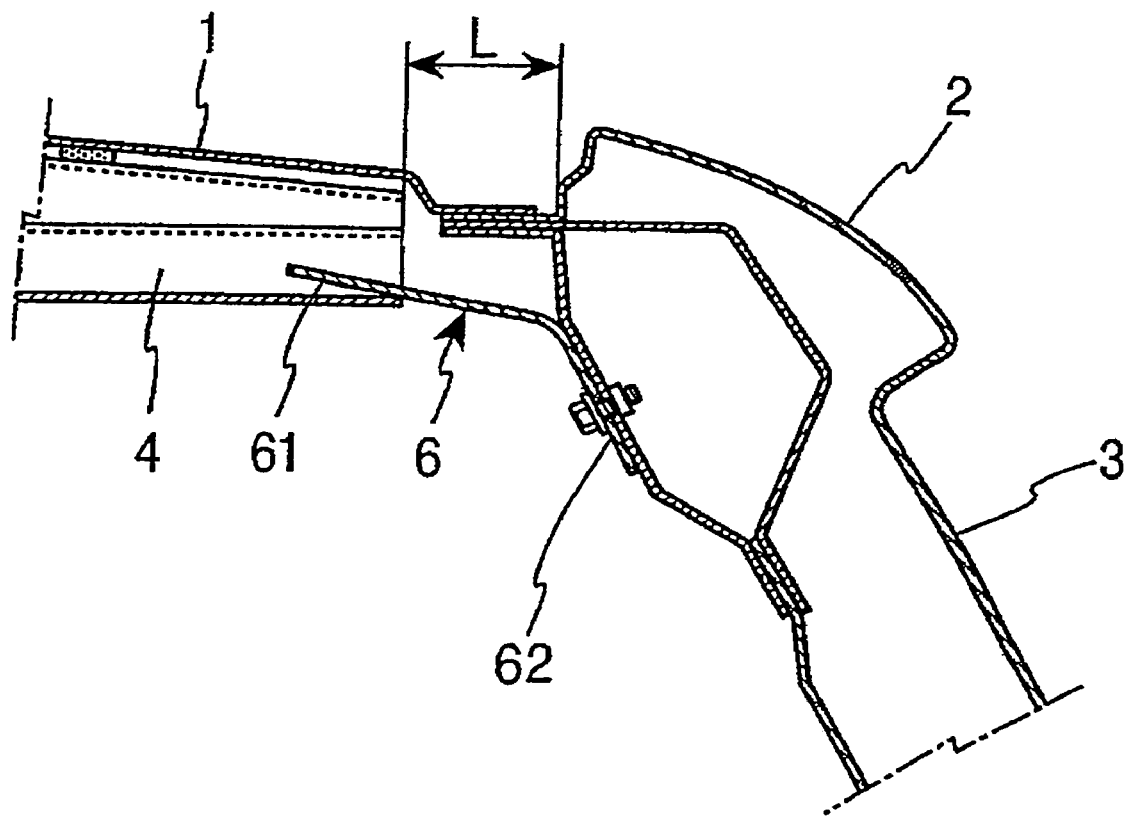
FIG. 5 is a cross-sectional diagram along line V-V of FIG. 4.
Figure 6:
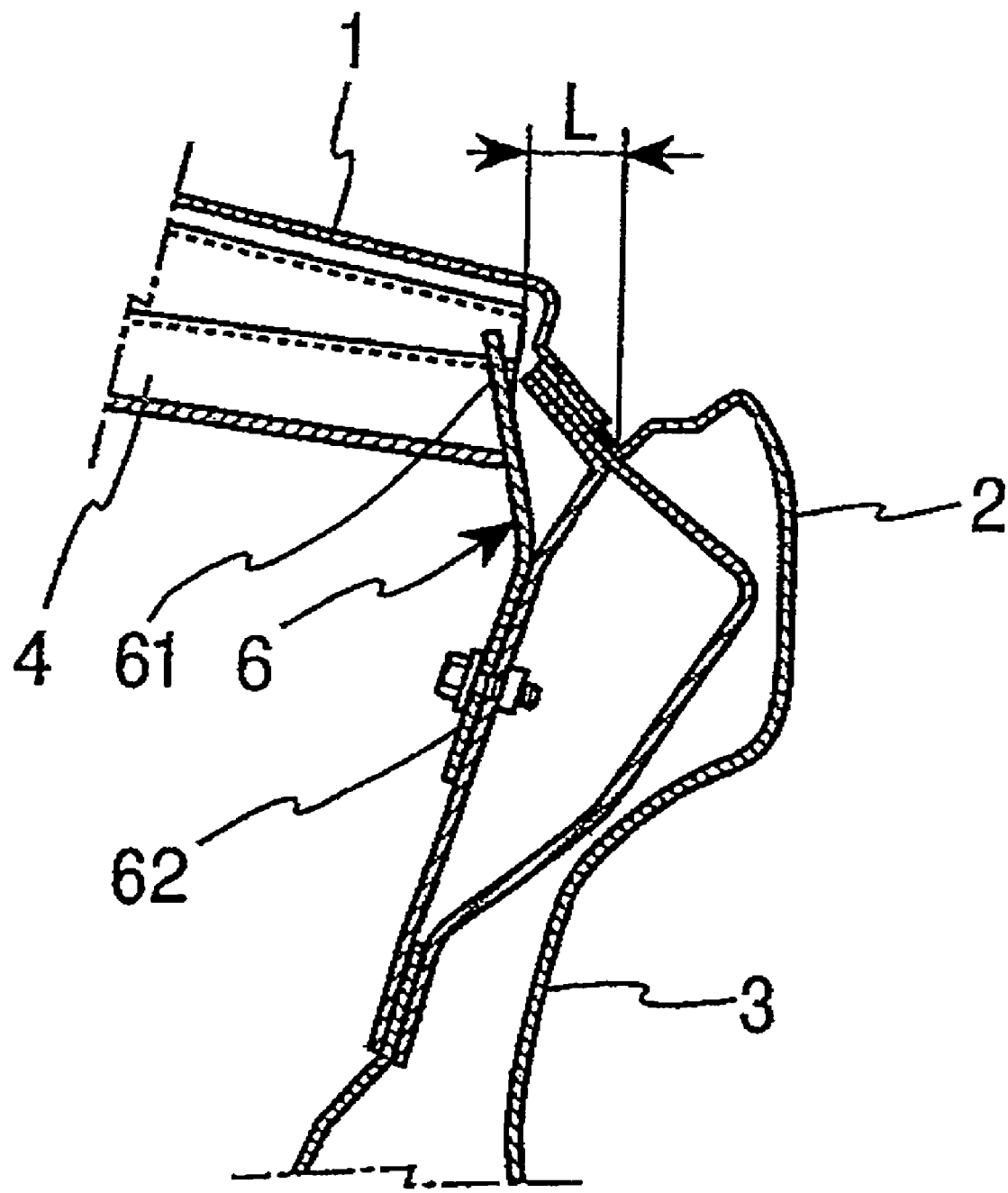
FIG. 6 is a cross-sectional diagram illustrating the situation of the prior art roof structure in FIG. 5 during a vehicle side collision.

During a vehicle side collision, the acting force of the center pillar 3, which deforms to a substantially V shape that points into the vehicle interior, gives rise to a rotational moment (denoted by the white arrow M in FIG. 2) that twistingly deforms the lower end side of the roof side rail 2 toward the vehicle interior. The head edge 54 of the base plate 50 of the bracket 5 is spaced apart from the lower portion of the side surface 21 of the roof side rail 2, with no abutting therebetween, and the protruding pieces 55, 55 that protrude from the head edge 54 are inserted in the slits 22, 22 of the side surface 21. As a result, the rotational moment M causes the lower edge of the roof side rail 2 to rotate (direction denoted by arrow M1 in FIG. 3) toward the vehicle interior, at a position in the vicinity of the curved root of the upper edge flange 20 of the roof side rail 2, such that the pivoting point of the rotational motion stands in the vicinity of the portion at which the roof side rail 2 abuts the upper ends of the upstanding end edges 56 of the upstanding sections 51, 52, 53 of the bracket 5, as illustrated in FIG. 3. As a result, the protruding pieces 55, 55 become inserted deeper into the slits 22, 22.

In the invention, thus, the lower edge of the roof side rail 2 is allowed to rotate on account of the rotational moment M. Therefore, the push-up load resulting from the rotational moment M of the roof side rail 2 is not transmitted to the bracket 5 or to the roof reinforcement member 4, and thus the roof reinforcement member 4 does not break by being pushed up.

The above rotation further causes the side surface 21 of the roof side rail 2 to abut the upstanding end edges 56, on the vehicle exterior side, of the upstanding sections 51, 52, 53 of the bracket 5, so that the roof side rail 2 is supported, from the vehicle interior, by the roof reinforcement member 4 via the bracket 5. This prevents the roof side rail 2 from moving into the vehicle interior, and thus the distance L between the roof side rail 2 and the end of the roof reinforcement member 4 does not shrink, unlike in conventional structures. Therefore, the roof side rail 2 hardly moves into the vehicle, and thus the entire center pillar is accordingly prevented from moving into the vehicle interior.

In the embodiment, the cross-sectional shape of the bracket 5 includes a plurality of upstanding sections 51, 52, 53 that are shaped the same as the roof reinforcement member 4. However, the cross-sectional shape of the bracket 5 need not necessarily match the cross-sectional shape of the roof reinforcement member 4, and these two members may have dissimilar cross-sectional shapes. For instance, the cross-sectional shape of the bracket 5 may simply be a substantially U shape made up of a base plate and two flange-like side-edge upstanding sections that rise from both side edges of the base plate.

However, connection between the bracket 5 and the roof reinforcement member 4 is easier if the cross-sectional shapes of the foregoing match each other.

The stiffness of the bracket 5 in the longitudinal direction (vehicle width direction) can be reinforced by providing a plurality of upstanding sections, so that the bracket 5 does not break between the roof side rail 2 and the roof reinforcement member 4 during a side collision.

The invention is not limited to a configuration wherein the roof reinforcement member 4 is provided at a position corresponding to the center pillar 3. The invention can also be used in roof reinforcement members that are disposed in the vicinity of the center pillar 3 and other pillars, so that the pillars can be prevented from deforming toward the vehicle interior.

DESCRIPTION OF THE REFERENCE NUMERALS 1 roof panel
2 roof side rail
21 side surface
22 slit
3 center pillar
4 roof reinforcement member
44 end
5 bracket
50 base plate
51, 52 side-edge upstanding section
53 central upstanding section
54 head edge of base plate
55 protruding pieces
56 upstanding end edge of upstanding section

The invention claimed is:
1. An automobile roof structure, comprising:
left and right roof side rails extending in a front-rear direction along left and right side edges of a roof panel, and supported by a center pillar of a side surface of a vehicle body;
a roof reinforcement member extending in a vehicle width direction along the underside of the roof panel, whose total length is shorter than the distance between the left and right roof side rails; and
brackets wherein both ends of the roof reinforcement areconnected to the roof side rails via the brackets,
wherein
each bracket fixes to an end of the roof reinforcement member a base end of a base plate connecting the end of the roof reinforcement member to each roof side rail,
an upstanding section is formed, on the base plate of the bracket, to extend in the longitudinal direction of the bracket, and a protruding piece is formed, on a head edge that opposes the roof side rail, to extend tongue-like from the head edge,
an upper end of an upstanding end edge of the upstanding section erected from the head edge abuts a side surface of the roof side rail on a vehicle interior side, and a lower portion of the upstanding end edge does not abut the side surface, with a gap being provided therebetween, and a slit is formed on the side surface of the roof side rail, on the vehicle interior side, at a position lower than an abutting position against the upstanding end edge of the upstanding section, such that the protruding piece is inserted into the slit.

2. The automobile roof structure according to claim 1, wherein the upstanding end edge of the upstanding section is erected substantially linearly in an oblique direction relative to the side surface such that the upper end of the upstanding end edge abuts the side surface of the roof side rail, on the vehicle interior side, and a substantially triangular gap is provided between the lower portion of the upstanding end edge and the side surface.

3. The automobile roof structure according to claim 1, wherein the protruding piece extends, from the head edge of the base plate of the bracket, obliquely downward toward the exterior of the vehicle, and the leading end of the protruding piece is inserted into the slit.

4. The automobile roof structure according to claim 1, wherein a plurality of the upstanding sections is formed in the base plate, and the base plate has a corrugated cross-sectional shape.

5. The automobile roof structure according to claim 1, wherein the cross-sectional shape of the base end of the base plate is identical to the cross-sectional shape of the end of the roof reinforcement member, and the base end is overlappingly fixed to the end of the roof reinforcement member.

6. The automobile roof structure according to claim 1, wherein the roof reinforcement member is disposed at a position corresponding to left and right center pillars of the side surfaces of the vehicle body, and both ends of the roof reinforcement member are connected, via the brackets, to joints between the roof side rails and the center pillars.

* * * * *